United States Patent

McMahon et al.

[15] 3,645,523

[45] Feb. 29, 1972

[54] SEAT SPRING UNIT

[72] Inventors: Harold I. McMahon, High Point, N.C.; Albin J. Niewulis, Lexington, Ky.

[73] Assignee: Hoover Ball and Bearing Company, Saline, Mich.

[22] Filed: Jan. 27, 1970

[21] Appl. No.: 6,256

[52] U.S. Cl. ............................................................267/107
[51] Int. Cl. .........................................................A47c 23/16
[58] Field of Search....................267/107, 108, 109, 110, 111

[56] References Cited

UNITED STATES PATENTS

| 3,361,423 | 1/1968 | Gniech et al. | 267/107 |
| 2,591,185 | 4/1952 | Neely | 267/107 X |

Primary Examiner—Arthur L. La Point
Attorney—Olsen and Stephenson

[57] ABSTRACT

A seat spring unit mounted on horizontally spaced frame rails and consisting of upper and lower connected spring members. The upper spring member forms the primary load support section for the spring unit and includes a return bent upon itself section at its rear end which is supported on the lower spring member. This construction thus adapts the spring unit for supporting light loads wherein the entire resistance to the load is taken up by the upper spring member, the return bent section of which provides increased comfort for the seat occupant in the occupant's tail bone area where principal support is necessary for comfort. When heavier loads are applied to the spring unit, the lower spring member provides additional resilient resistance to load after the upper spring member has been deflected, thus enabling construction of seating units capable of comfortably supporting occupants whose weights vary over a wide range.

6 Claims, 4 Drawing Figures

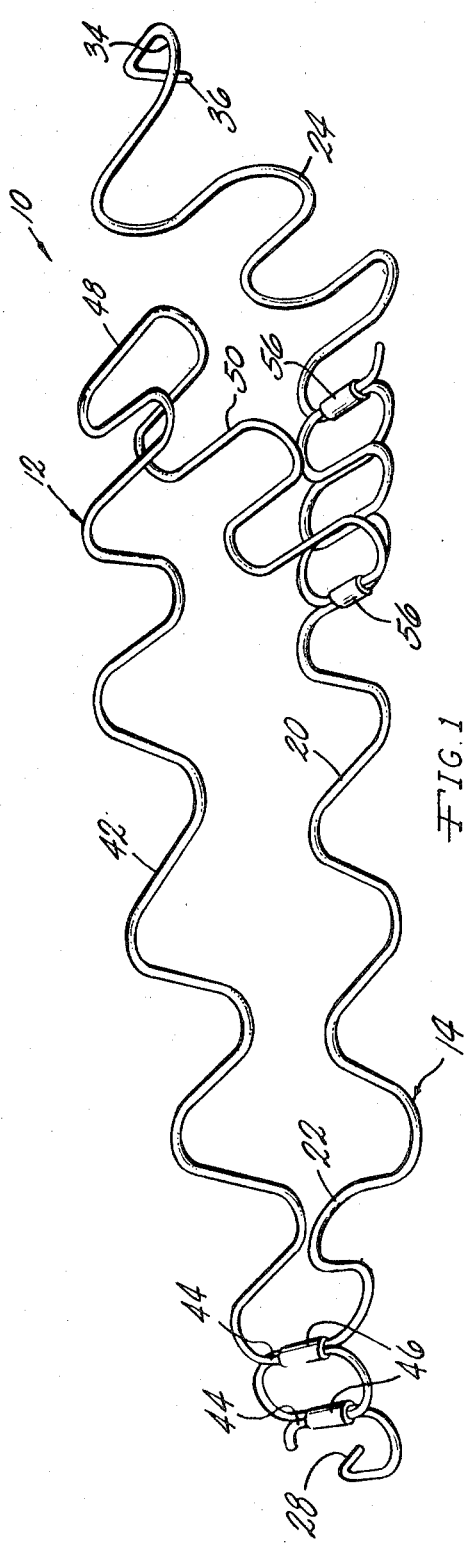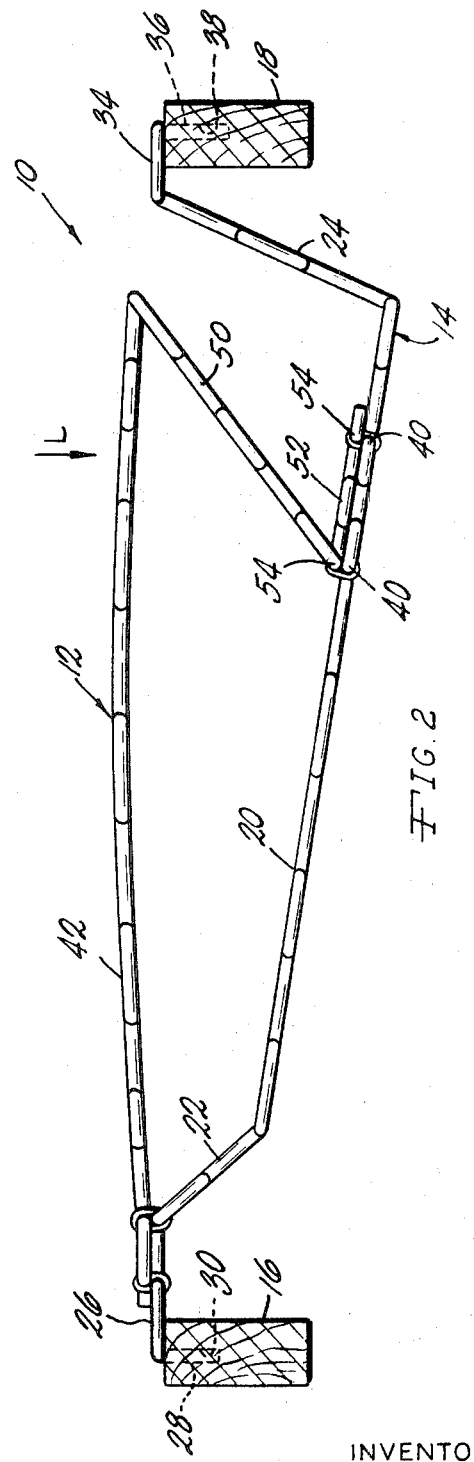
INVENTORS
HAROLD I. McMAHON
ALBIN J. NIEWULIS
BY
Olsen and Stephenson
ATTORNEYS

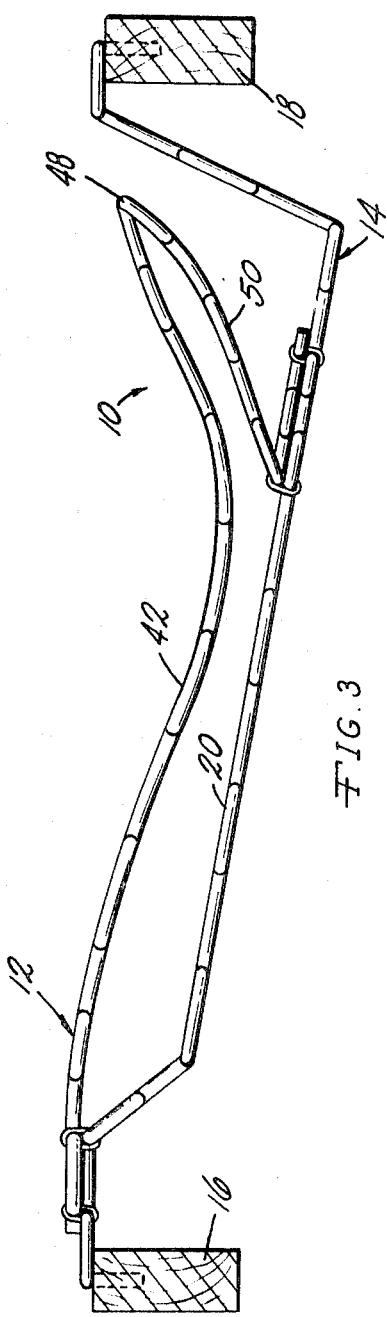
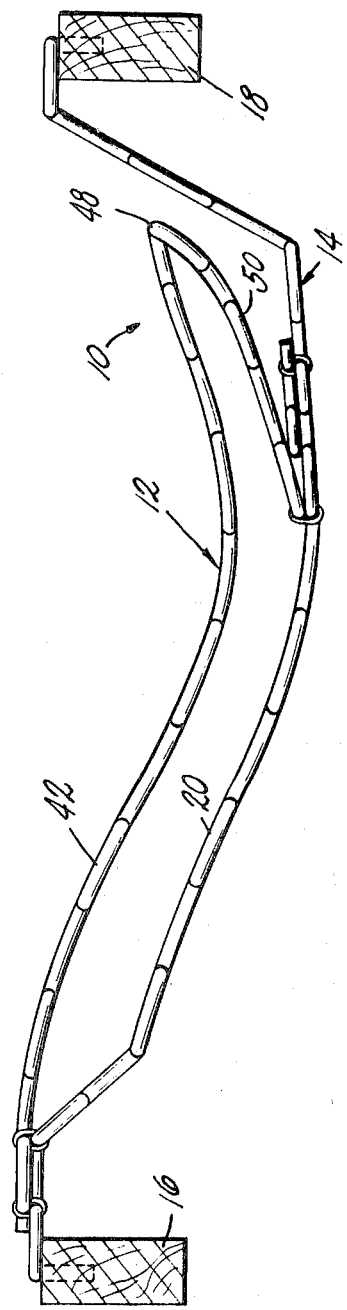

SEAT SPRING UNIT

This invention relates generally to springs for seating structures and more particularly to an improved spring unit capable of providing improved seat occupant comfort and having loading resisting characteristics which vary over a wide range.

In seating structures of the type to which this invention relates, such as furniture chairs and sofas, the principal area of the spring unit which affects the comfort of the seat occupant is the area of the spring unit adjacent the back cushion in the seating structure. This portion of the spring unit supports what is commonly referred to as the tail bone area of the seat occupant which is the area of the occupant through which the principal seating loads are transmitted to the spring unit. It is desirable to provide a spring unit which is capable of resiliently yielding to the tail bone load without bottoming out in response to the application of heavy tail bone loads. The principal objective of the present invention, therefore, is to provide a spring unit capable of providing a tail bore support which will quickly yield under load and to provide cooperating primary and secondary load-supporting sections in the spring which can yieldably resist heavier loads.

The spring unit of this invention consists of a pair of upper and lower connected spring members, each of which includes a plurality of torsion bars. The upper spring member is formed at its rear end with a return bent upon itself section so that it has a downwardly and forwardly inclined portion that extends under the main load-supporting portion. The downwardly and forwardly inclined portion terminates in a foot which is supported on and connected to the lower spring member, and as a result, when a seating load is applied to the upper spring member, the rear end portion readily deflects so as to resiliently drop away from the seat occupant to thereby provide the desired seating comfort. The lower spring member includes a main section and upwardly inclined end sections which are mounted on the usual frame rails so as to locate the load-supporting portion of the upper spring member at the desired elevation relative to the frame rails. As a consequence, when a heavy load is applied to the spring unit, the upper spring member is allowed to continue its deflection by deflection of the lower spring member to thus accord the desired seating comfort without danger of the spring unit bottoming out so as to give the feeling of unyielding support.

Further objects, features and advantages of this invention will become apparent from a consideration of the following description, the appended claims, and the accompanying drawing in which:

FIG. 1 is a perspective view of one embodiment of the spring unit of this invention;

FIG. 2 is a side elevational view of the spring unit of FIG. 1, shown mounted on a pair of frame rails, and showing the spring unit in an unloaded condition;

FIG. 3 is a side elevational view of the spring unit of FIG. 1, illustrated similarly to FIG. 2, showing the deflected position of the spring unit when subjected to a relatively light seating load; and FIG. 4 is a side elevational view, illustrated similarly to FIGS. 2 and 3, of the spring unit of FIG. 1, showing the spring unit in a deflected position caused by the support of a heavy load thereon.

With reference to the drawing, the spring unit of this invention, indicated generally at 10, is illustrated in FIGS. 1 and 2 as including an upper spring member 12 and a lower spring member 14 which are vertically spaced and are connected in a manner hereinafter described. The unit 10 is illustrated in FIG. 2 in an unloaded condition mounted on a seating structure frame which includes a front rail 16 and a rear rail 18. The lower spring unit 14 has a main section 20 formed at its front end with an upwardly and forwardly inclined portion 22 and at its rear end with an upwardly and rearwardly inclined portion 24. The front end portion 22 terminates in a horizontally extending foot 26 formed with a prong 28 inserted in an opening 30 in the frame rail 16. The foot 26 includes torsion bars which function for a purpose to be hereinafter described. Similarly, the rear portion 24 terminates in a foot 34 provided with a prong 36 extended into an opening 38 in the rear frame rail 18. Intermediate its ends, the main section 20 the lower spring member 14 has torsion bars lower 40 which function for a purpose to be hereinafter described.

The upper spring member 12 includes a main load-supporting section 42 having a pair of torsion bars 44 at its front end which are secured by conventional clips 46 to the torsion bars 32 in the lower spring member 14 so as to mount the front end of the upper spring member 12 on the lower spring member 14. The rear end of the main load-supporting section 42 of the upper spring member 12 is return bent upon itself, by twisting a rear end torsion bar 48 so as to provide a downwardly and forwardly inclined rear end portion 50 which extends under the load-supporting section 42. The inclined section 50 terminates in a foot 52 which is parallel to the main section 20 of the lower spring member 14. The foot 52 includes a pair of torsion bars 54 which are parallel to and disposed in a side-by-side relation with the torsion bars 40 in the lower spring member 14. Conventional clips 56 are employed to connect the side-by-side torsion bars 40 and 54 so as to mount the rear end of the upper spring member 12 on the lower spring member 14.

In the operation of the spring unit 10, assume that a seating load, the major portion of which is located substantially as indicated by the arrow L in FIG. 2, is applied to the unit 10. For seating comfort purposes, it is desirable that the unit 10 readily drop away from the load L to give the feeling to the seat occupant of resilient support in the tail bone area, namely, the area of the occupant located adjacent the rear frame rail 18. The return bent upon itself construction of the upper spring member 12 provides this result, as illustrated in FIG. 3, which shows how the upper spring member 12 readily deflects in a downwardly concave form so as to yieldably resist the load. In other words, the section 42 of the spring 12 functions as a primary load-supporting section which readily deflects toward the inclined end portion 50 without causing substantial deflection of the lower spring member 14. However, when the magnitude of the load L causing the primary deflection illustrated in FIG. 3 is increased, the main section 20 of the lower spring member 14 is capable of functioning as a secondary load-supporting section so that it will likewise deflect to the downwardly concave form illustrated in FIG. 4. Thus, the spring unit 10 is capable of yieldably resisting loads extending over a wide range of magnitudes. When light loads are applied to the spring unit 10, the primary load-supporting section 42 resists the load and when the load is heavier, the spring section 20 cooperates with the section 42 to provide the necessary yieldable resistance to the load to impart comfort to the seat occupant. In all cases, the primary load-supporting section 42 readily folds downwardly toward the inclined end section 50, since the torsion bar 48 will readily twist, so as to quickly impart a feeling of resilience to the seat occupant. It is to be understood that this return bent upon itself construction at the rear end of the upper spring member 12 is readily adaptable to other forms of spring units within the purview of this invention, for example, a spring unit in which both ends of the primary load-supporting section 42 would be provided with inwardly inclined end sections 50 which extend under the primary load-supporting section 42.

We claim:

1. In a seating structure which includes a pair of frame rails, a spring unit supported on and extending between said rails, said spring unit having vertically spaced primary and secondary load-supporting sections, each of said supporting sections including a plurality of connected torsion bars, said primary section having an end portion supported on and disposed above said secondary section, said end portion being return bent upon itself so that it is inclined downwardly toward said secondary section in a direction away from the adjacent frame rail, said end portion terminating in a plurality of torsion bars positioned adjacent to and connected to torsion bars in said secondary section the ends of said secondary section being connected to said frame rails and a main portion thereof being arranged in a supporting relation with said end portion of said primary section, said secondary section including an upwardly inclined end portion located between said primary end portion and said adjacent frame rail.

2. A seating structure according to claim 1 wherein said secondary section includes a second upwardly extending end portion terminating in a foot supported on the other one of said frame rails, and wherein said primary section has a second end portion supported on said foot.

3. A spring unit comprising upper and lower vertically spaced spring members, said upper spring member having a main load support section and being return bent downwardly upon itself at one end of said section so as to have an inclined portion extended under said load support section, said upper member being secured at its ends to said lower member, said lower spring member having a main section engaged with said inclined portion of said upper spring member and upwardly extending end sections one of which is adjacent to and spaced horizontally from said inclined portion of said upper spring member.

4. A spring unit according to claim 3 wherein the other one of said lower spring member end sections terminates in a foot, means securing one end of said upper spring member to said foot, and means securing the opposite end of said upper spring member to said lower spring member main section adjacent to said one end section.

5. A spring unit according to claim 4 wherein said upper and lower spring members include horizontally spaced torsion bars, the torsion bars at the ends of said upper spring member being engaged with disposed in a side-by-side relation with some of the torsion bars in said lower spring member, and clip means securing said side-by-side torsion bars together.

6. A spring unit according to claim 5 wherein said load-support section of said upper spring member and said main section of said lower spring member are substantially coextensive in length.

* * * * *